(12) United States Patent
Major

(10) Patent No.: US 11,245,936 B2
(45) Date of Patent: Feb. 8, 2022

(54) DYNAMIC CONTENT INSERTION ON A USER-BY-USER BASIS

(71) Applicant: DISH Network L.L.C., Englewood, CO (US)

(72) Inventor: Robert Drew Major, Orem, UT (US)

(73) Assignee: DISH Network L.L.C., Englewood, CO (US)

( * ) Notice: Subject to any disclaimer, the term of this patent is extended or adjusted under 35 U.S.C. 154(b) by 3 days.

(21) Appl. No.: 16/721,295

(22) Filed: Dec. 19, 2019

(65) Prior Publication Data

US 2021/0195260 A1   Jun. 24, 2021

(51) Int. Cl.
| | |
|---|---|
| *H04N 21/234* | (2011.01) |
| *H04N 21/258* | (2011.01) |
| *H04N 21/442* | (2011.01) |
| *H04N 21/47* | (2011.01) |
| *H04N 21/84* | (2011.01) |
| *H04N 21/462* | (2011.01) |
| *H04N 21/478* | (2011.01) |

(52) U.S. Cl.
CPC . *H04N 21/23424* (2013.01); *H04N 21/25891* (2013.01); *H04N 21/44222* (2013.01); *H04N 21/47* (2013.01); *H04N 21/84* (2013.01); *H04N 21/4622* (2013.01); *H04N 21/478* (2013.01)

(58) Field of Classification Search
None
See application file for complete search history.

(56) References Cited

U.S. PATENT DOCUMENTS

| | | | |
|---|---|---|---|
| 2003/0066078 A1* | 4/2003 | Bjorgan | H04N 21/458 725/34 |
| 2007/0219859 A1* | 9/2007 | Huntington | H04N 21/25866 705/14.45 |
| 2015/0151660 A1* | 6/2015 | Goldman | B60N 3/108 296/1.07 |
| 2017/0188116 A1 | 6/2017 | Major et al. | |

(Continued)

OTHER PUBLICATIONS

U.S. Appl. No. 15/394,355, Inventor: Robert Drew Major, 57 pages.

(Continued)

*Primary Examiner* — Jefferey F Harold
*Assistant Examiner* — Charles N Hicks
(74) *Attorney, Agent, or Firm* — Kilpatrick Townsend & Stockton LLP

(57) ABSTRACT

Various arrangements for performing dynamic content insertion are presented. A user profile may be identified as active at a television receiver based on the user profile being mapped to a current television viewing session. A plurality of content items that have been output for presentation while the user profile is active may be tracked across a plurality of television viewing sessions. A set of insertion rules may be evaluated that are mapped to a content item. The content item may be determined to have met an output threshold for the user profile. An alternative piece of content may be selected for insertion based on the set of insertion rules and determining that the content item has met the output threshold for the user profile. The television receiver may be triggered to substitute the alternative content item into a television channel stream to replace the content item.

17 Claims, 6 Drawing Sheets

(56) References Cited

U.S. PATENT DOCUMENTS

2017/0208369 A1   7/2017  Major et al.
2020/0107061 A1*  4/2020  Huber ................ H04N 21/4622

OTHER PUBLICATIONS

U.S. Appl. No. 15/393,548, Inventor: Robert Drew Major et al., 31 pages.
U.S. Appl. No. 62/787,169, filed Specification, Claims, and Drawings, 29 pages.
U.S. Appl. No. 16/514,865, filed Specification, Claims, Drawings, and Abstract, 40 pages.
U.S. Appl. No. 62/787,211, filed Specification, Claims, and Drawings, 7 pages.
U.S. Appl. No. 16/731,960, filed Dec. 31, 2019, Inventor: Robert Drew Major, Specification, Claims, and Abstract, 15 pages.
International Search Report and Written Opinion for PCT/US2020/066017 dated Feb. 22, 2021, all pages.

* cited by examiner

DYNAMIC CONTENT INSERTION ON A USER-BY-USER BASIS

BACKGROUND

Content presented on television can be an effective way to reach a large audience. When a user views a piece of content for the first time, the user may tend to pay particular attention. However, if the same piece of televised content is viewed by the user repeatedly, the user may lose interest and either not pay attention (e.g., leave the room, look at another device, talk to someone, read a magazine, etc.) or may change the channel. From the perspective of a content provider, there may be little benefit to outputting the same piece of content to the same user repeatedly. Therefore, it may be beneficial to vary the content presented on a user-by-user basis.

SUMMARY

Various embodiments are described related to a method for performing dynamic content insertion. In some embodiments, a method for performing dynamic content insertion is described. The method may include identifying a user profile as active at a television receiver based on the user profile being mapped to a current television viewing session. The method may include tracking a plurality of content items that have been output for presentation while the user profile may be active across a plurality of television viewing sessions. Tracking the plurality of content items may comprise determining a number of times that each content item of the plurality of content items has been output while the user profile may be active across the plurality of television viewing sessions. The method may comprise evaluating a set of insertion rules that may be mapped to a content item. The method may comprise determining that the content item of the plurality of content items has met an output threshold for the user profile. The method may comprise selecting an alternative content item for insertion based on the set of insertion rules and determining that the content item has met the output threshold for the user profile. The method may comprise triggering the television receiver to substitute the alternative content item into a television channel stream to replace the content item. The method may comprise outputting, by the television receiver, the television channel stream that includes the alternative content item.

Embodiments of such a method may include one or more of the following features: determining a confidence value indicative of how likely the user profile identified as active may be correct. The method may comprise tracking the plurality of content items that have been output for presentation at a household level regardless of any user profile. Determining that the content item of the plurality of content items has met the output threshold for the user profile may comprise determining a weighting value based on the determined confidence value indicative of how likely the user profile identified as active may be correct. The method may comprise calculating an output value based on the weighting value the determined number of times that the content item has been viewed while the user profile may be active, and a number of times the content item has been viewed at the household level based on a household profile, and determining that the output value has met the output threshold. Tracking the plurality of content items further may comprise determining an output rate during a time period for each content item of the plurality of content items has been output while the user profile may be active across the plurality of television viewing sessions. Determining that the content item of the plurality of content items has met the output threshold for the user profile may comprise determining that the output rate during the time period has met or exceeded a threshold rate value for the content item. The plurality of content items may be advertisements presented during television commercial breaks. Identifying the user profile may be based on a hierarchical evaluation of a plurality of user profile identification factors. The hierarchical evaluation of the plurality of user profile identification factors may comprise determining the user profile based on a type of content being output for presentation. Triggering may comprise a remote server system transmitting an insertion message to the television receiver. The method may further comprise retrieving, by the television receiver, the alternate content item from a processor-readable storage medium of the television receiver.

In some embodiments, a dynamic content insertion system is described. The system may comprise a television service provider system. The system may comprise a metadata insertion system that adds metadata to a plurality of television channel streams prior to the plurality of television channel streams being transmitted to a plurality of television receivers. The system may comprise a user identification system that may identify a user profile as active at a television receiver based on the user profile being mapped to a current television viewing session. The system may comprise a tracking system that tracks a plurality of content items that has been output for presentation while the user profile may be active across a plurality of television viewing sessions. Tracking the plurality of content items may comprise the tracking system being configured to determine a number of times that each content item of the plurality of content items has been output while the user profile may be active across the plurality of television viewing sessions. The system may comprise an insertion trigger system that may evaluate a set of insertion rules that may be mapped to a content item. The insertion trigger system may determine that the content item of the plurality of content items has met an output threshold for the user profile. The insertion system may select an alternative piece of content for insertion based on the set of insertion rules and determining that the content item has met the output threshold for the user profile. The insertion system may trigger the television receiver to substitute the alternative content item into a television channel stream to replace the content item.

Embodiments of such a system may include one or more of the following features: the system further may comprise the plurality of television receivers. Each television receiver of the plurality of television receivers may transmit feedback via the Internet to the television service provider system indicative of a content item. The insertion triggering system that triggers the television receiver to substitute the alternative content item in the television channel stream may be configured to transmit an insertion trigger message via the Internet. The insertion trigger message may indicate a content item identifier and an alternative content item identifier. The system further may comprise a plurality of streaming content viewer devices. The user identification system may be configured to determine a confidence value indicative of how likely the user profile identified as active may be correct. The tracking system may be configured to track the plurality of content items that have been output for presentation at a household level regardless of any user profile. The insertion trigger system that determines that the content item of the plurality of content items has met the output threshold for the user profile may comprise the insertion trigger system being configured to determine a weighting value based on the determined confidence value indicative of how likely the user profile identified as active may be correct. The insertion trigger system may be configured to calculate an output value based on the weighting value, the determined number of times that the content item has been viewed while the user profile may be active, and a number of times the content item has been viewed at the household level based on a household profile. The insertion trigger system may be configured to determine that the output value has met the output threshold. The tracking system may be configured to determine an output rate during a time period for each content item of the plurality of content items has been output while the user profile may be active across the plurality of television viewing sessions.

In some embodiments, a non-transitory processor-readable medium comprising processor-readable instructions is described. The non-transitory processor-readable medium comprising processor-readable instructions may be configured to cause one or more processors to identify a user profile as active at a television receiver based on the user profile being mapped to a current television viewing session. The one or more processors may track a plurality of content items that have been output for presentation while the user profile may be active across a plurality of television viewing sessions. Tracking the plurality of content items may comprise determining a number of times that each content item of the plurality of content items has been output while the user profile may be active across the plurality of television viewing sessions. The one or more processors may evaluate a set of insertion rules that may be mapped to a content item. The one or more processors may determine that the content item of the plurality of content items has met an output threshold for the user profile. The one or more processors may select an alternative content item for insertion based on the set of insertion rules and determining that the content item has met the output threshold for the user profile. The one or more processors may trigger the television receiver to substitute the alternative content item into a television channel stream to replace the content item

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
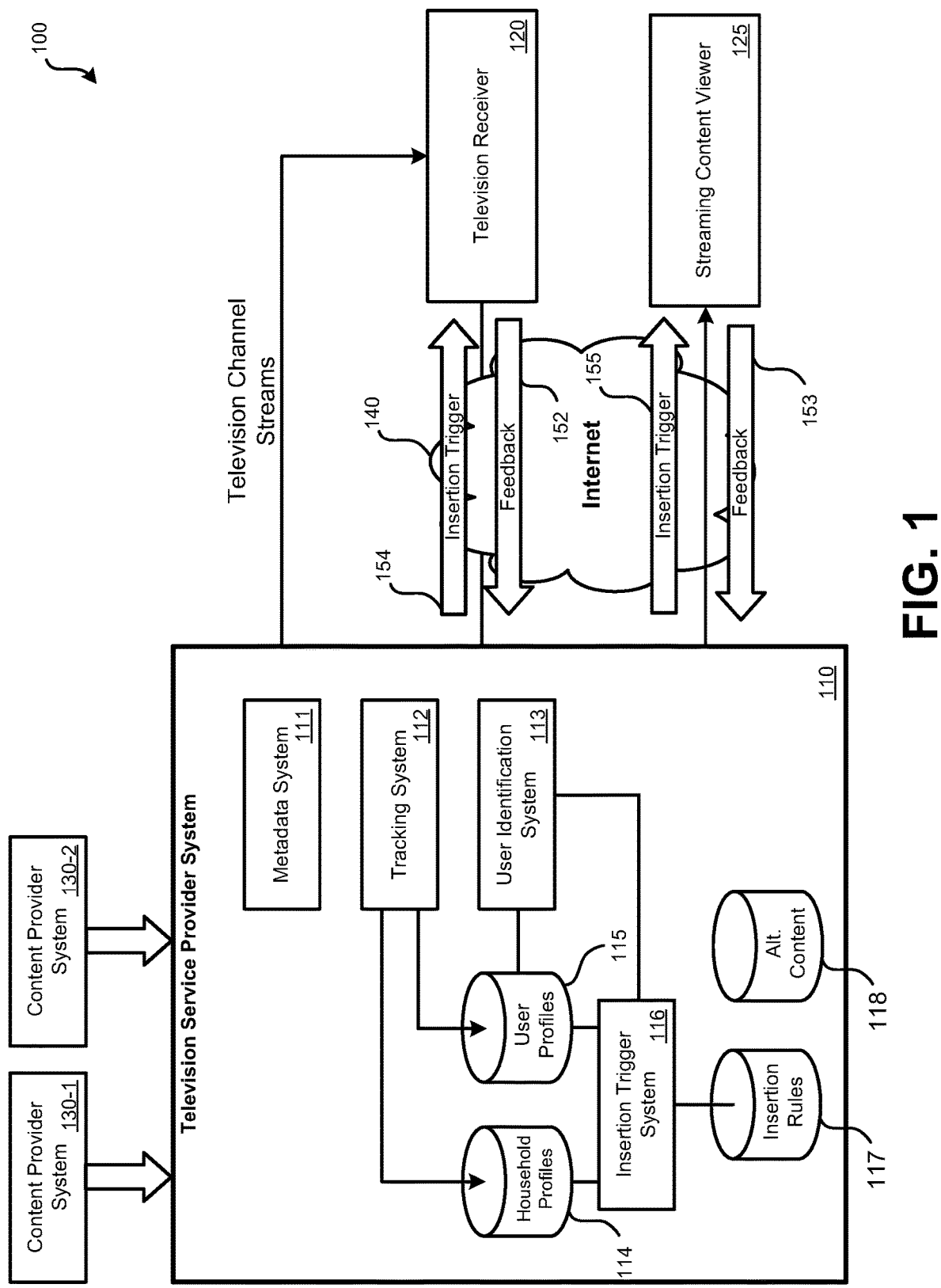
FIG. 1 illustrates an embodiment of a system for performing dynamic content insertion.

A particular user may tend to watch his or her favorite television channels repeatedly, which can result in the user viewing the same content many times. While an entity, such as an advertiser, may desire the user to view a particular piece of content (e.g., a commercial) multiple times, beyond that, additional viewing of the content may have significantly diminished returns.

First, repeatedly being exposed to the same content item may be boring for the user and can result in the user becoming disengaged from his television viewing session. Second, the entity may by paying significant sums of money to have the content transmitted on the television channel; therefore, the entity may desire to avoid paying for distribution of the content when the user will have marginal interest, at best.

Dynamic content insertion (DCI) refers to the insertion of content to replace another piece of content in a television channel stream. Typically, a television channel involves commercial breaks at various stages during the broadcast of a television program. In lieu of presenting a content item (e.g., a commercial) that was included as part of the television channel transmission, an alternative content item may be inserted to replace the content item. Embodiments detailed herein are focused on performing DCI on a user-by-user basis in response to the number of times or rate at which a particular content item present in television channel transmissions has been output for presentation to a particular user.

Analysis of content viewership may be performed on a per-user basis. For a given television viewing session, a determination is made as to which user is currently viewing the televised content. For instance, a user may watch over-the-top (OTT) content using a first computerized device and may at some other time view the same or different television channels broadcast via a television distribution system (e.g., a satellite-based system, a cable system, an IP system, etc.) to a television receiver (e.g., a set top box). Therefore, it may be beneficial to track a given user across multiple viewing devices. The specific content items viewed by the user across one or more viewing devices may be tracked. When a particular content item has been output a threshold number of times or has met a threshold rate (e.g., four times per week) of being output to the user, an alternative piece of content may be substituted in its place for presentation to the user. This substitution may be performed for any content item present in a television channel broadcast or transmission or may be performed on only certain designated content items.

In some embodiments, it may be difficult to ascertain with certainty the particular user that is viewing televised content. For instance, multiple users may be viewing a same device together. In addition to tracking the output of content on a user-by-user basis, the output of content items may be tracked on a household basis. A household profile may be used for tracking all content items viewed in association with a particular household, such as all user profiles that are linked with a particular subscription. To determine whether a viewing threshold has been met, a weighting value that is based on a confidence of how likely the selected user profile accurately represents the user(s) viewing the televised content may be evaluated in combination with the active user profile and the household profile. If a viewing threshold is exceeded, alternative content may be inserted into the version of the television channel output for presentation. An indication of the alternative content that was inserted may be provided to the television service provider for tracking purposes, such as to provide compensation or data to the entity whose content was replaced.

Further detail regarding these and other embodiments is provided in relation to the figures. FIG. 1 illustrates an embodiment of a system 100 for performing dynamic content insertion. System 100 can include: television service provider system 110; television receiver 120; streaming content viewer 125; content provider systems 130; and the Internet 140. Collectively, television receivers and streaming content viewers are referred to as "viewing devices" within this document. Content provider systems 130 provide streams of television channels that include content items to television service provider system 110. Each content provider system of content provider systems 130 can represent a particular television channel, such as NBC, CBS, FOX, ESPN, ABC, CNN, etc. Each content provider may have sold advertising space during commercial breaks. Therefore, the television channel streams received from content provider systems 130 by television service provider system 110 can include television programs interspersed with commercials, each of which can be referred to individually as a content item. Therefore, the embodiments detailed herein can be used to replace commercials, television programs, or both. For simplicity, only two content provider systems 130 are illustrated. It should be understood that television service provider system 110 may receive many more television channel streams from various content provider systems.

Television service provider system 110 can be a computerized system that comprises one or more centralized or distributed server systems. Television service provider system 110 can include metadata system 111, tracking system 112, user identification system 113, and insertion trigger system 116. These systems may be implemented using one or more processing systems that include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). Television service provider system 110 can further include household profiles database 114; user profiles database 115; insertion rules database 117; and alternative content database 118. Each of these databases may be stored using one or more non-transitory processor-readable mediums. Television service provider system 110 may further include components to transmit television channel streams via a television distribution system, which can include a cable system, satellite system, IP-based system, or some other system that distributes television programming.

Television service provider system 110 may insert metadata in each television channel stream prior to distributing or broadcasting. Metadata system 111, which may be implemented using computerized components, may analyze each received television channel stream from content provider systems 130 and may insert metadata that identifies content items present within each television channel stream. For instance, each different content item present within each television channel stream may be assigned a unique identifier. Therefore, if the same content item appears on different channels, the same unique identifier may be associated with each instance of the content item. This metadata may be transmitted along with the television channel stream to various television receivers, such as television receiver 120. In some embodiments, rather than metadata system 111 being used to add a certain identifier particular to each content item in a television channel stream, such metadata may be provided as part of the television channel stream received from content provider systems 130.

Television receiver 120 may be a set top box (STB) or incorporated as part of the smart television. Television receiver 120 may be configured to function as part of a satellite-based television distribution system, a cable-based television distribution system, a fiber-optic based television distribution system, or an IP-based television distribution system. Further detail regarding embodiments that involve television receiver 120 are provided in relation to FIG. 2. Since television channel streams are broadcast by television service provider system 110 to multiple television receivers, without receiving some form of feedback, it may not be possible for television service provider system 110 to determine which content items were output for presentation at individual television receivers. Television receiver 120 may transmit feedback 152 via Internet 140 to television service provider system 110. Feedback 152 can indicate the particular content items that were output for presentation by television receiver 120. Therefore, feedback 152 can include unique content identifiers that were inserted by metadata system 111 or are provided as part of the television channel streams received from content provider systems 130. As illustrated in FIG. 1, communication to television service provider system 110 from television receiver 120 can be performed via Internet 140. However, in other embodiments, communication from television receiver 120 to television service provider system 110 can be performed via some other communication method, such as via a dial-up modem communication arrangement, via a NB-IoT (narrowband Internet of Things) network, or via a cellular communication connection.

Tracking system 112 may receive feedback 152 from television receiver 120. Tracking system 112 may use the feedback that is indicative of the particular content items that were output for presentation by television receiver 120 to update user profiles database 115 and household profiles database 114. The particular user profile and the particular household profile that are to be updated may be determined by either television receiver 120 or by user identification system 113. User identification system 113 may use data included in feedback 152 to determine the particular user profile that is to be updated. Detail regarding how a particular user profile may be identified as active is provided in relation to the method of FIG. 4. Tracking system 112 can update the appropriate user profile and the household profile that is linked with the user profile in user profile databases 115 and household profiles database 114, respectively. Table 1 illustrates an example embodiment of a few user profiles that may be stored as part of user profiles database 115. For each content item that is output for presentation, tracking system 112 may add information, such as adding or updating an entry in user profiles database 115. The information tracked in user profiles database 115 may indicate the number of times and the rate over a given time period that individual content items have been output for presentation while the user profile was determined to be active.

TABLE 1

| User Profile | Content Item #1 | Number of views | Number of Views Within Last Week | Content Item #2 | Number of Total Views | Number of Views within Last Week |
|---|---|---|---|---|---|---|
| Joseph.Hogan | 349574 | 4 | 2 | 1348543 | 1 | 1 |
| Kieran.Thomas | 034539 | 7 | 5 | 2344378 | 5 | 0 |
| William.Jerry | 349574 | 3 | 1 | 2344378 | 4 | 3 |

Table 1 merely serves as an example as to how data for particular content items may be stored in relation to user profiles. In other embodiments, other data storage arrangements may be used that organize similar data differently. In some embodiments, a separate household profiles database is not necessary. Rather, an indication of the particular user profiles that are mapped to a given household profile is stored. As such, the household profile can be constructed by summing the data for the individual user profiles that are mapped to the household profile. If a separate household profile database, such as household profiles database 114, is used, the data may be stored in a format similar to user profiles database 115, but on a household basis. Therefore, entries may contain similar information as in Table 1, but may be mapped to an entire household that includes multiple users.

While some viewing of television channel streams is performed via broadcasts that are received and output by television receivers, such as television receiver 120, a user may use another device, such as streaming content viewer 125, to view television channel streams. Streaming content viewer 125 may be some form of computerized device, such as: a smart phone; cellular phone; a tablet computer; a smart TV; a gaming device; a streaming media player; a desktop or laptop computer system; or some other form of computerized device that has incorporated or can be connected with a display device. For instance, a possible streaming content viewer 125 is a smart phone that has an application installed that is particular to television service provider system 110 and allows for access to television channel streams output by television service provider system 110. Such television channel streams may be delivered via Internet 140 in an over-the-top (OTT) arrangement. It may be possible that a same user may use television receiver 120 to view television channel streams and that at another time that user can use streaming content viewer 125 to view television channel streams.

In some embodiments, streaming content viewer 125 may receive over-the-air (OTA) broadcasts of television programs from a streaming device connected with an OTA antenna that receives VHF and UHF broadcasts of television channels. The streaming device may receive the OTA broadcast, transcode, packetize, and retransmit an OTA television channel via a network (e.g., a local WLAN, the Internet, or both) to streaming content viewer 125.

When streaming content viewer 125 is being used to view a television channel stream, feedback 153 may be used to indicate identifiers of particular content items that have been output for presentation. However, it may also be possible that television service provider system 110 can directly determine the particular content items that were output for presentation by streaming content viewer 125 without feedback 153. Since a television channel stream transmitted via an OTT arrangement is transmitted only to streaming content viewer 125 and is not generally broadcast, television service provider system 110 can track the particular content items that were included in the television channel stream transmitted to streaming content viewer 125. Therefore, when a television channel stream is transmitted to streaming content viewer 125, tracking system 112 may monitor the output television channel stream to identify the content items present and record an indication of such content items to the appropriate user profile of user profiles database 115 and to the appropriate household profile of household profiles database 114.

In other embodiments, an insertion trigger 155 may be transmitted by television service provider system 110 to streaming content viewer 125 that indicates: an identifier of the content item to be replaced and an identifier of the alternative content item to insert in place of the content item. Alternative content items may have been previously transmitted and stored by streaming content viewer 125. Therefore, only an insertion trigger to cause the alternative content item to be inserted may be needed to be transmitted by television service provider system 110 to streaming content viewer 125. Insertion trigger 155 may be transmitted via Internet 140. Upon receipt and processing of insertion trigger 155, streaming content viewer 125 may begin monitoring for a next instance of the content item to be replaced based on the unique identifier of the content item being present in the metadata of television channel streams. When located, streaming content viewer 125 may insert the alternative content item in its place.

In the illustrated embodiment of FIG. 1, a single television receiver 120 and a single streaming content viewer 125 are illustrated. It should be understood that in real-world embodiments, many more television receivers and streaming content viewers may be present. For instance, a single user may be associated with multiple television receivers and/or multiple streaming content viewers. Further, system 100 may operate for a large number of users, therefore resulting in a large number of user profiles, household profiles, television receivers, and streaming content viewers that are in communication with television service provider system 110.

Insertion trigger system 116 may be used to determine when a content item in a television channel stream should be replaced with an alternative content item. Insertion trigger system 116 may analyze data present in user profiles database 115, household profiles database 114, insertion rules database 117, and information, such as confidence data or a weighting value, received from user identification system 113. Insertion rules database 117 may define particular rules for: 1) the circumstances for when a particular content item should be replaced; and 2) the qualifications for the alternative piece of content to replace the content item. For each content item that is eligible to be replaced, an entry may be present in insertion rules database 117. The entry may indicate, along with the unique identifier of the content item, a threshold number of times that the content item is to be output to a user prior to the content item being eligible for replacement. The entry may also indicate a threshold rate for a given time period that, when reached makes the content item eligible for replacement. The entry may also indicate the particular alternative content item that is to be substituted for the content item when one of the output thresholds for the content item has been reached. In some embodiments, rather than a particular alternative content item being preselected for replacement of the content item, characteristics that are required to be present for alternative content items may be included instead. For instance, a maximum rating (e.g., G, PG, PG-13) for the alternative piece of content may be required. Other requirements may include the alternative piece of content being within or outside of a particular industry. (For instance, an automotive company may not want their content item to be substituted with another automotive company's content item.) The alternative piece of content can be required to be a particular duration to fit in the same time period of the content item.

By analyzing the viewership data present in household profiles database 114, user profile database 115, and in combination with insertion rules database 117, insertion trigger system 116 can determine when a content item should be replaced with an alternative content item. An insertion trigger 154 may be transmitted by television service provider system 110 to television receiver 120 that indicates: an identifier of the content item to be replaced and an identifier of the alternative content item to insert in place of the content item. Alternative content items may have been previously transmitted and stored by television receiver 120. Therefore, only an insertion trigger to cause the alternative content item to be inserted is needed to be transmitted by television service provider system 110 to television receiver 120. Insertion trigger 154 may be transmitted via Internet 140 or via some other communication arrangement. For instance, in a satellite-based television provider system, an addressed message to television receiver 120 may be transmitted. Upon receipt and processing of the insertion trigger, television receiver 120 may begin monitoring for a next instance of the content item to be replaced based on the unique identifier of the content item being present in the metadata of television channel streams. When located, television receiver 120 may insert the alternative content item in its place.

In some embodiments, streaming content viewer 125 may function similarly in that alternative content is stored locally by streaming content viewer 125 for insertion upon receiving an insertion trigger. In some embodiments, however, alternative content items may be stored by television service provider system 110 and may be directly inserted into the television channel stream transmitted directly via Internet 140 to streaming content viewer 125. In such an arrangement, alternative content does not need to be stored directly by streaming content viewer 125, but can be inserted by television service provider system 110 from alternative content database 118.

In system 100, components such as tracking system 112, user profiles database 115, household profiles database 114, insertion trigger system 116, and insertion rules database 117 are incorporated as part of television service provider system 110. In other embodiments, such components may be locally implemented as part of television receiver 120, streaming content viewer 125, or both. In such arrangements, user profiles may be established and monitored independently on such devices. In some embodiments, occasionally or periodically, television receiver 120 and/or streaming content viewer 125 may update a central storage of user profiles and/or household profiles at television service provider system 110.

Figure 2:
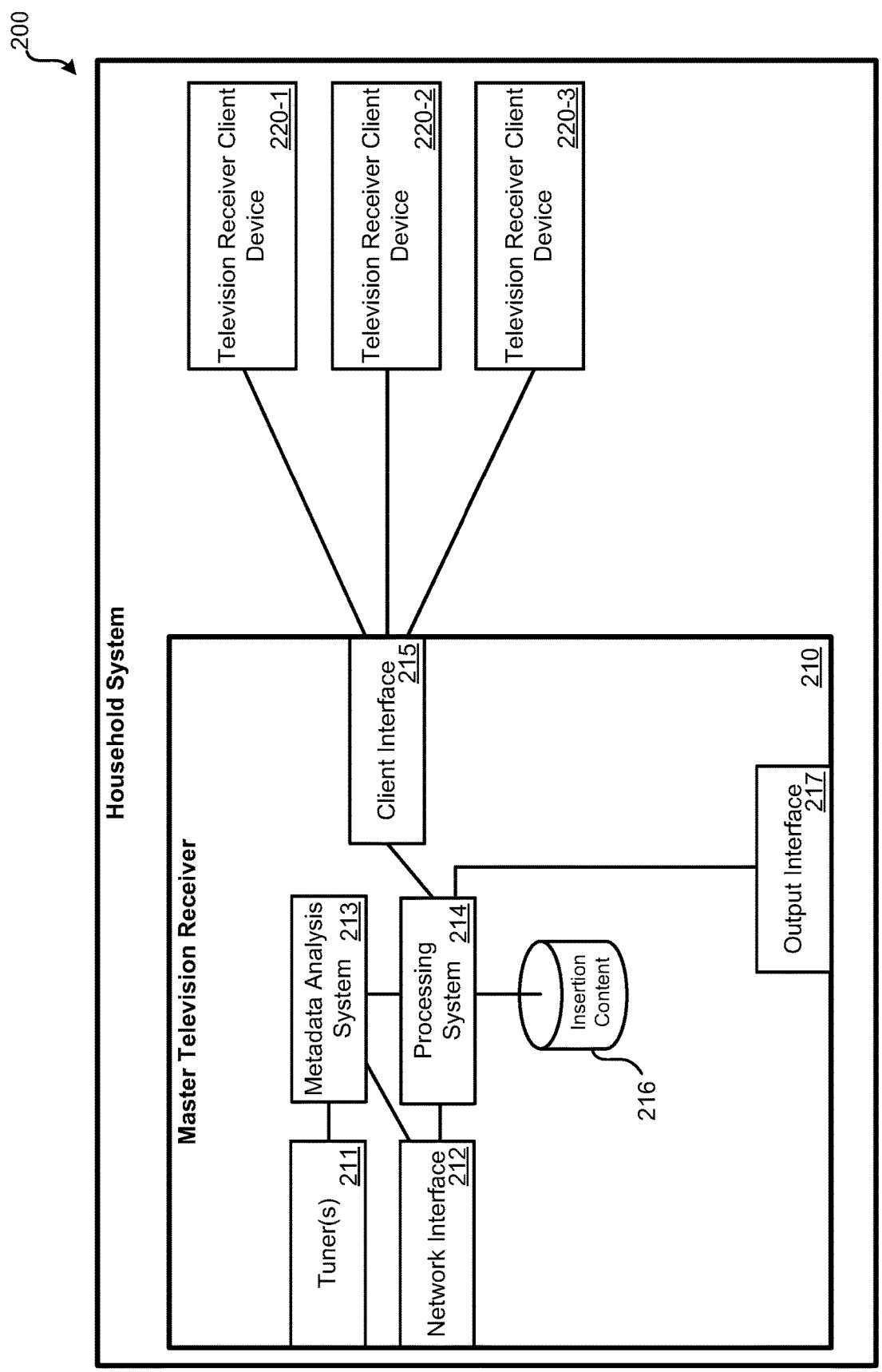
FIG. 2 illustrates an embodiment of a household television viewing system.

FIG. 2 illustrates an embodiment of a household television viewing system 200. Household television viewing system 200 includes master television receiver 210 and television receiver client devices 220. In such an arrangement, master television receiver 210 may have functionality each of television receiver client devices 220 does not possess. For instance, only master television receiver 210 may communicate with a television service provider system, while television receiver client devices 220 may communicate with only master television receiver 210. Further, master television receiver 210 may have the ability to record and store content, while television receiver client devices 220 may only be able to output content streamed to them by master television receiver 210.

Master television receiver 210 may function as television receiver 120 of FIG. 1. Master television receiver 210 can include: one or more tuners 211; network interface 212; metadata analysis system 213; processing system 214; client interface 215; insertion content database 216; and output interface 217. Tuners 211 can be tuned to particular frequency bands to receive broadcasts of television channel streams. These streams may be broadcast via a satellite-based television distribution system, cable based television distribution system, or some other form of television distribution system.

Metadata analysis system 213 may analyze metadata present and received television channel streams and output indications of the content items' identifiers to processing system 214. Client interface 215 may stream requested television channel streams to television receiver client devices 220. Therefore, metadata analysis system 213 may capture the content item identifiers for television channel streams being streamed to one or more of television receiver client devices 220. An indication of the particular client device that is outputting the television channel stream may be mapped to the content item identifiers.

Processing system 214 may create the feedback indicative of the content items being viewed to be output via network interface to television service provider system 110. It should be understood that components such as metadata analysis system 213 may be implemented using processing system 214. Processing system 214 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Feedback may be transmitted via network interface 212 to the television service provider system, such as via the Internet. Network interface 212 may be configured to communicate via wired or wireless network, such as a home wireless local area network that communicates using an IEEE 802.11 wireless communication protocol. Insertion content database 216 may include one or more non-transitory processor readable mediums and may serve to store alternative content items that have been received from the content provider system. Alternative content items may be transmitted to master television receiver 210 via a television distribution network and received via tuner 211 and/or may be transmitted to master television receiver 210 via the Internet and received via network interface 212. Each alternative content item stored within insertion content database 216 may be mapped to a unique content identifier, such that when an insertion trigger is received by master television receiver 210 via either tuner 211 or network interface 212, processing system 214 can determine the appropriate alternative content item from insertion content database 216 to insert. This insertion may be performed on a television channel stream that is being directly output by master television receiver 210 via output interface 217 to a television (or other form of display device) or streamed within household system 200 to a television receiver client device of television receiver client devices 220.

As illustrated, three television receiver client devices 220 are present. This number of television receiver client devices is merely exemplary. In other embodiments, a greater or fewer number of television receiver client devices may be present. In other embodiments, rather than a particular television receiver having greater functionality than other television receivers, all television receivers within household television viewing system 200 may be capable of relatively the same functions. In such embodiments, each television receiver may communicate via a network interface with the television service provider system.

In some embodiments, each television receiver within household television viewing system 200 may be linked to a particular user profile. For instance, if television receiver client device 220-1 is located within a particular user's bedroom, input that links a user profile of the user who resides in the bedroom with television receiver client device 220-1 may be used to associate the user with television receiver client device 220-1. Therefore, if television receiver client device 220-1 is in use, it is assumed that the user is almost certainly the bedroom's resident. In other situations, a particular television receiver may not be linked to a particular user profile. For instance, master television receiver 210 may be located in the living room or other space where multiple users may use master television receiver 210 to view television channel streams.

Figure 3:
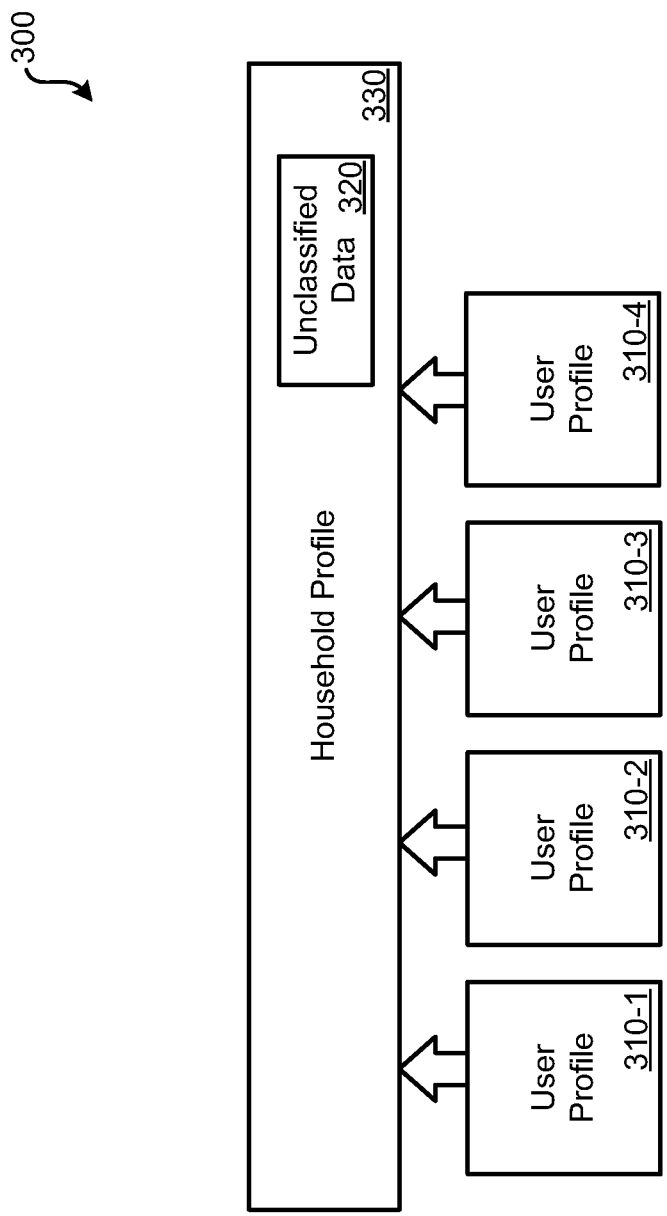
FIG. 3 illustrates an embodiment of the relationship between a household profile and user profiles.

FIG. 3 illustrates an embodiment 300 of the relationship between a household profile and user profiles. In the illustrated example, four user profiles have been created for four different users associated with a particular subscription account. Data for each user profile that reflects the particular content items viewed may be maintained separately. Therefore, for a first user, user profile 310-1 may be maintained and indicate content items that were output to the first user. In a similar manner, user profile 310-2, user profile 310-3, and user profile 310-4 may be maintained for second, third, and fourth users respectively.

All of the data gathered on behalf of these users that is stored as part of user profiles 310 may also be used to create household profile 330. In some embodiments, a separate household profile is maintained which is updated whenever an individual user profile that is mapped to the household profile is updated. For instance, if the second user sees a particular content item, both user profile 310-2 and household profile 330 may be updated to indicate that the content item was output for presentation. In other embodiments, a particular household profile is not maintained. Rather, when household profile data is desired, all of the data present in the associated user profiles 310 may be summed to obtain the same data as would be present in a dedicated household profile 330.

In some embodiments, it may not be always possible to determine the particular user profile that should be associated with a given television channel stream viewing session. If a particular user profile cannot be accurately selected, data about the particular content items viewed may still be collected but may be stored as part of unclassified data 320. Unclassified data 320 may be used as part of household profile 330 but may not affect the contents of any particular user profile of user profiles 310. In fact, unclassified data 320 can be thought of as an additional user profile that serves as a catchall for recording content items that were output for presentation to an unidentified user.

In some embodiments, user profiles 310 are created by the users. That is, each user may create a user account or otherwise establish a viewing profile that the user tends to select prior to a television channel viewing session. For instance, if the user is using a streaming content viewer, such as streaming content viewer 125, each user may be required to have a username and password. Each username may be linked with its own user profile of user profiles 310. However, if a user only uses a television receiver, it may not be required that the user create a user profile. For such situations, the user's viewing habits may be monitored and a user profile may be created when a particular user has been identified as the viewer. For example, if a television receiver tends to output cartoons and the nightly news, two user profiles may be established since it is unlikely that it is the same viewer watching the cartoons in the nightly news. A first user profile may be established for the viewer who tends to request the output of television channel streams that includes cartoons and a second user profile may be established for the other viewer who tends to request the output of television channel streams that includes the nightly news.

Figure 4:
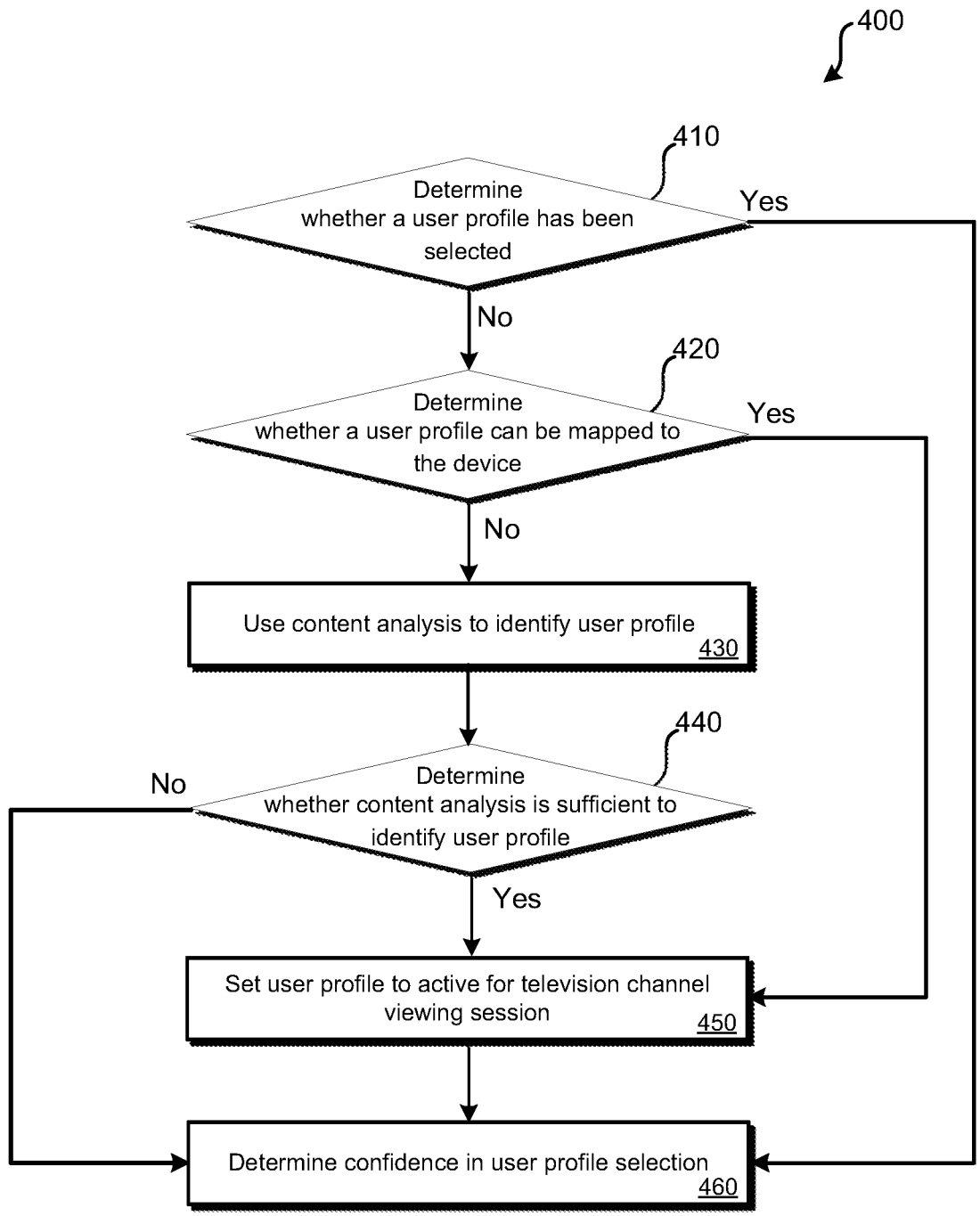
FIG. 4 illustrates an embodiment of a method for hierarchically determining an active user profile from a plurality of user profiles.

Various methods may be performed using the embodiments detailed in relation to FIGS. 1-3. FIG. 4 illustrates an embodiment of a method 400 for hierarchically determining an active user profile from a plurality of user profiles. Method 400 may be performed locally at the television receiver or streaming media player device or may be performed in the cloud at the television service provider system, such as television service provider system 110. The evaluation of method 400 may be hierarchical. That is, factors that identify the particular user profile that is to be made active that have a high degree of confidence may be evaluated first. Such factors are not determinative; factors having a lower confidence may be used.

At block 410, a determination of whether a user profile has been selected may be made. A user profile may be selected by a user, for example, selecting a user profile that corresponds to the user prior to beginning or during a television viewing session. If the user is using a streaming content viewer, the user may provide a username and password to login. The username and password may serve to select a particular user profile. Alternatively, in some embodiments, a same username and password are used for an entire household and the user may be prompted to or requested to select a particular user profile before beginning a television viewing session. If such a user profile is selected, method 400 may proceed to block 450 where that particular user profile is selected and set to active for the television viewing session. At block 460, a confidence in the user profile selection may be determined. A set of predefined confidences may be assigned to particular factors. For instance, block 410 may be considered a first factor that, if determined in the affirmative, results in a high confidence, such as 90% or 100%. It may be desirable to not use 100% because there is always the possibility that an additional user may view content with the user that selected his own profile. For instance, a family may tend to watch television together.

At block 420, which is evaluated if block 410 is determined in the negative, a determination is made as to whether a particular user profile can be mapped to the viewing device being used. For example, if a smart phone is being used to view a television channel stream, the smart phone may have been previously associated with a particular user and user profile. By virtue of the television service provider system receiving an identifier of the viewing device, such as a MAC address, a particular user profile that has been mapped to the viewing device can be selected without the user having manually selected the user profile. Also, a television receiver may be associated with the particular user by virtue of the room in which the television receiver is located. For instance, if user input has previously been received that indicates that a television receiver is installed in a particular user's bedroom, the television receiver may be mapped to a particular user profile of the room's resident. If block 420 is determined in the affirmative, method 400 may proceed to block 450 where the determined user profile is set to active for the television viewing session and block 460 is performed in which a confidence in the user profile selection is determined.

At block 430, which is evaluated if block 420 is determined in the negative, content analysis may be performed in an attempt to identify the user profile that should be active. For each user profile, a list of favorite genres of content, favorite television channels, and/or favorite times of day to watch television may be maintained at the television service provider system or locally at the viewing device. This data may be used to select the appropriate user profile by performing content analysis at block 430. For a defined period of time, such as for the first 20 minutes of a television channel viewing session, the content selected for output may be analyzed while data about the content items viewed is maintained in a provisional user profile. For instance, if in a household only one particular user tends to watch the nightly news, when a television channel stream that is outputting the nightly news is selected for output for most of the defined period of time, a determination may be made that the user profile associated with the user that tends to watch the nightly news should be activated. Data temporarily stored in the provisional user profile may be incorporated as part of the identified user profile.

At part of block 430, a confidence value may be determined. The confidence value reflects the likelihood that the correct user profile has been selected. For instance, if a type of content is being viewed that is only associated with the particular user profile, a relatively high confidence value may be determined; however, if a type of content is being viewed that is frequently viewed in association with the particular user profile but is also sometimes viewed in association with another user profile, a relatively low confidence value may be determined.

At block 440, a determination may be made as to whether the content analysis performed at block 430 has a sufficiently high enough confidence to identify a user profile. For instance, a threshold confidence may be set such that, based on the result of block 430, block 440 either proceeds to block 460 or block 450. That is, if the confidence determined based on the content analysis is below the threshold confidence value, no user profile may be selected and a confidence in the user profile selection may be set to zero or some other low number at block 460. However, if the determined confidence value exceeds the threshold confidence, method 400 may proceed to block 450 in which the user profile identified based on the content analysis is set to active for the television channel viewing session. At block 460, the confidence determined as part of the content analysis at block 430 may be used as the confidence value of block 460.

If block 430 cannot successfully be performed with a sufficiently high confidence, method 400 may proceed to block 460 where a low confidence, such as 0%, is assigned for user profile selection. In some embodiments, rather than selecting no user profile, the most commonly used user profile may be selected, but a low confidence may be assigned. In some embodiments, no user profile will be selected and data related to output content items may be recorded as unclassified data as detailed in relation to FIG. 3. Such data may affect a household profile but may not affect an individual user profile linked with the household profile.

The confidence level determined at block 460 may be based at least in part on a predefined set of confidence values that have been established. For example, Table 2 may be used to determine the confidence values at block 460:

TABLE 2

| Factor | Confidence Value Selected |
| --- | --- |
| User profile selected by user | 95% |
| User profile mapped to device | 75% |
| Content analysis performed | 30%-70% |

The values of Table 2 are exemplary and may be set based on testing data to determine the relative accuracy of the different factors in identifying the correct user profile. As previously discussed, an additional situation to be kept in mind in setting the confidence value is the possibility that one or more additional users may also be viewing the television channel stream with the user that is mapped to the selected user profile.

Figure 5:
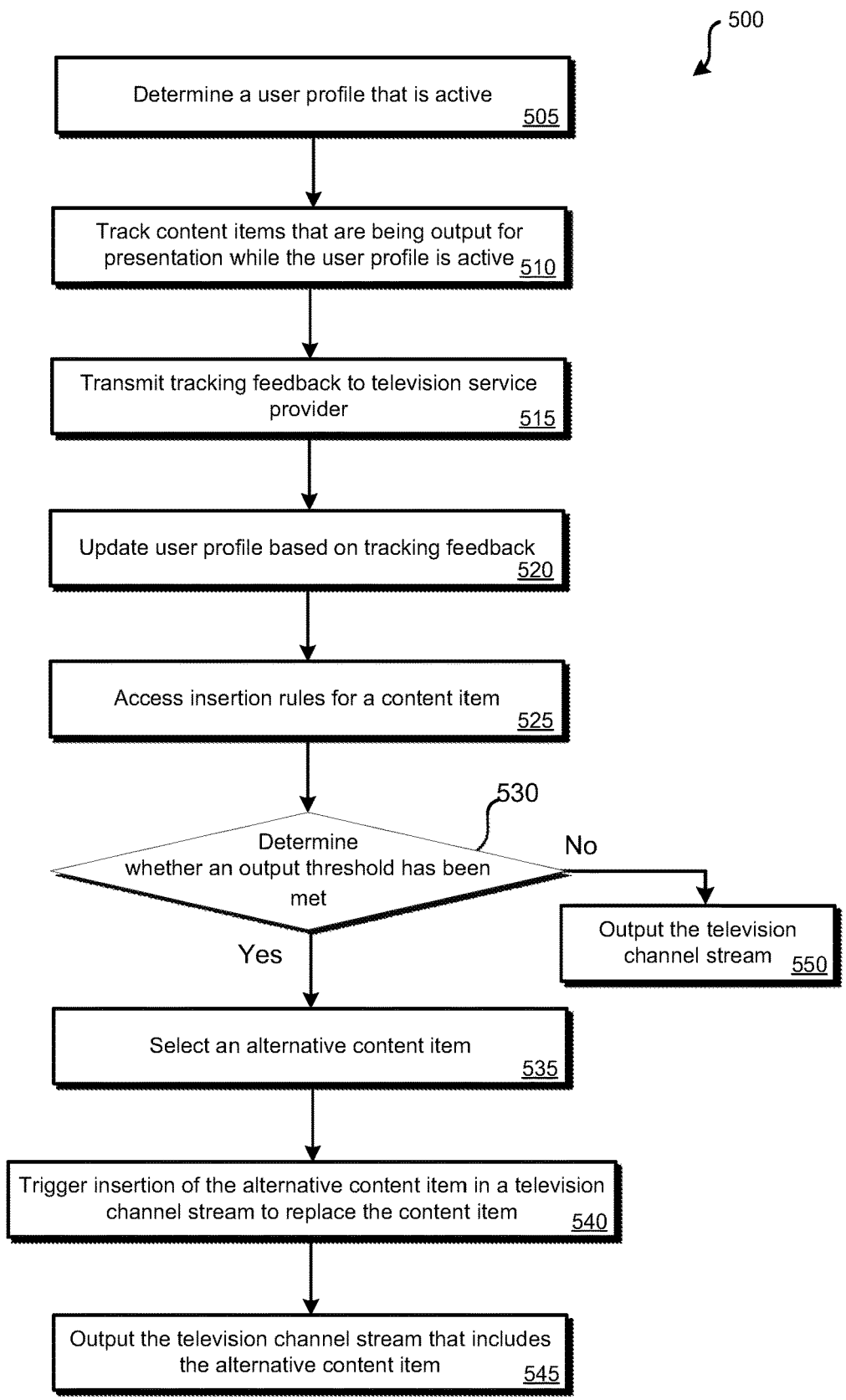
FIG. 5 illustrates an embodiment of a method for performing dynamic content insertion based on a user profile.

FIG. 5 illustrates an embodiment of a method 500 for performing dynamic content insertion based on a user profile. Method 500 may be performed using system 100 of FIG. 1 and, possibly, household television viewing system 200 of FIG. 2. At block 505, a determination may be made as to the user profile that should be set to active for the television channel viewing session. Block 505 may include performing some or all of the steps of method 400. The determination of block 505 may be performed by the television service provider system or by the device being used by the user, such as a television receiver or streaming content viewer.

At block 510, content items that are being output for presentation while the user profile is active may be tracked. This can include determining a content item identifier for each content item based on metadata included as part of the television channel stream. In some embodiments, this tracking may be performed at the television receiver. In some situations, this tracking may be performed by the television service provider system, such as if a streaming content viewer is used. If the identifiers of the content items that are output for presentation are collected locally by the viewing device, feedback may be transmitted to the television service provider system indicative of the content item identifiers at block 515. In some embodiments, this feedback may be transmitted in batches, such as on an occasional or periodic basis (e.g., once per hour, once per day). In other embodiments, as content items are viewed, feedback for the particular content item may be transmitted immediately. In some embodiments, if the user profile is maintained locally by the viewing device, block 515 may not be necessary. Rather, the user profile may be updated locally at block 520.

At block 520, the user profile determined to be active may be updated based on the tracking feedback. This can include updating the user profile to reflect that the content item was output for presentation along with, possibly, an indication of when the content item was output. Depending on where the user profile is maintained, the update of block 520 may be performed by the television service provider system or by the viewing device. Similarly, blocks 525-545 may be performed locally by the viewing device or by the television service provider system as embodied in FIG. 1.

At block 525, insertion rules that are mapped to future content items (such as a future instance of the same content item) that are to be included in the television channel stream for output for presentation may be accessed or insertions rules for content items for which the user profile was updated may be accessed. Insertion rules may be specific to each content item. For instance, an entity may want a content item shown to viewers many times, while another entity may only want its content items shown to viewers a few times. A table, such as Table 3, may be maintained that indicates a total output threshold, an output rate threshold, or both.

TABLE 3

| Content Item Identifier | Total Output Threshold | Output Rate Threshold (per week) |
| --- | --- | --- |
| 349574 | — | 2 |
| 574848 | 7 | — |
| 004399 | 2 | 1 |
| 271312 | 12 | 5 |

At block 530, a determination may be made as to whether an output threshold for any content item has been reached based on the data stored within the user profile. The output threshold may be based on a total number of outputs in association with the user profile. Additionally or alternatively an output threshold may be based on a rate of outputs over a defined period of time, such as a day or week, in association with the user profile. If an output threshold has not been met for a piece of content, the television channel stream may be output without any modifications at block 550. That is, no content is dynamically inserted into the television channel stream based on the user profile being analyzed in combination with the insertion rules. However, if an output threshold is determined to be met at block 530, method 500 may proceed to block 535.

As part of the insertion rules for individual pieces of content or stored as a separate data storage arrangement may be data that defines either the specific alternative content item that is to be inserted in place of a content item or characteristics that must be exhibited by the alternative content item. For instance, the characteristics may include a rating and an indication of an industry that the alternative content is required to be within or outside of. Table 4 illustrates data that can be included as part of the insertion rules.

TABLE 4

| Content Item Identifier | Specific Piece of Alternative Content? | Rating Requirement | Required Industry | Excluded Industry | Required Duration |
| --- | --- | --- | --- | --- | --- |
| 349574 | Y - 574848 | — | — | — | — |
| 574848 | N | PG, G | — | Automotive | 20 seconds |

TABLE 4-continued

| Content Item Identifier | Specific Piece of Alternative Content? | Rating Requirement | Required Industry | Excluded Industry | Required Duration |
| --- | --- | --- | --- | --- | --- |
| 004399 | Y - 271312 | — | — | — | — |
| 271312 | N | G | — | Children | Food | 30 seconds |

Once an appropriate alternative content item has been selected at block 535 by the television service provider system or by the viewing device, an insertion message that will trigger 540 insertion of the alternative content item to replace the content item that has met the output threshold is transmitted to the viewing device. The insertion message may also include an indication of the selected alternative content item (e.g., the alternative content item identifier). This step may only be necessary if the determination and selection is performed by the television service provider system. For television receivers and streaming content devices, multiple alternative content items may have already been received and stored locally, including the alternative content item that is to be inserted. The television receiver or streaming content device may store indications of the content item to be replaced and the alternative content item to be inserted; therefore, the device may monitor for the presence of the content item to be replaced in a television channel stream at least until the next time it appears and possibly for many future times in which the content item appears (either on a particular television channel or across multiple television channels). Alternatively, for streaming content devices, the alternative content may be dynamically inserted into the television channel stream by the television service provider system in place of the content item that met the output threshold.

At block 545, the television channel stream that includes the alternative content item substituted for the content item that met the output threshold may be output for presentation by either the television receiver or the streaming content. From the user's perspective, it may appear that the alternative content item was included as part of the original television channel stream. The television service provider system (or the viewing device) may store data indicative of the alternative content item being substituted for the content item that met the output threshold. Periodically or occasionally, the television service provider may provide information or payment to the entity associated with the content item that was replaced.

Figure 6:
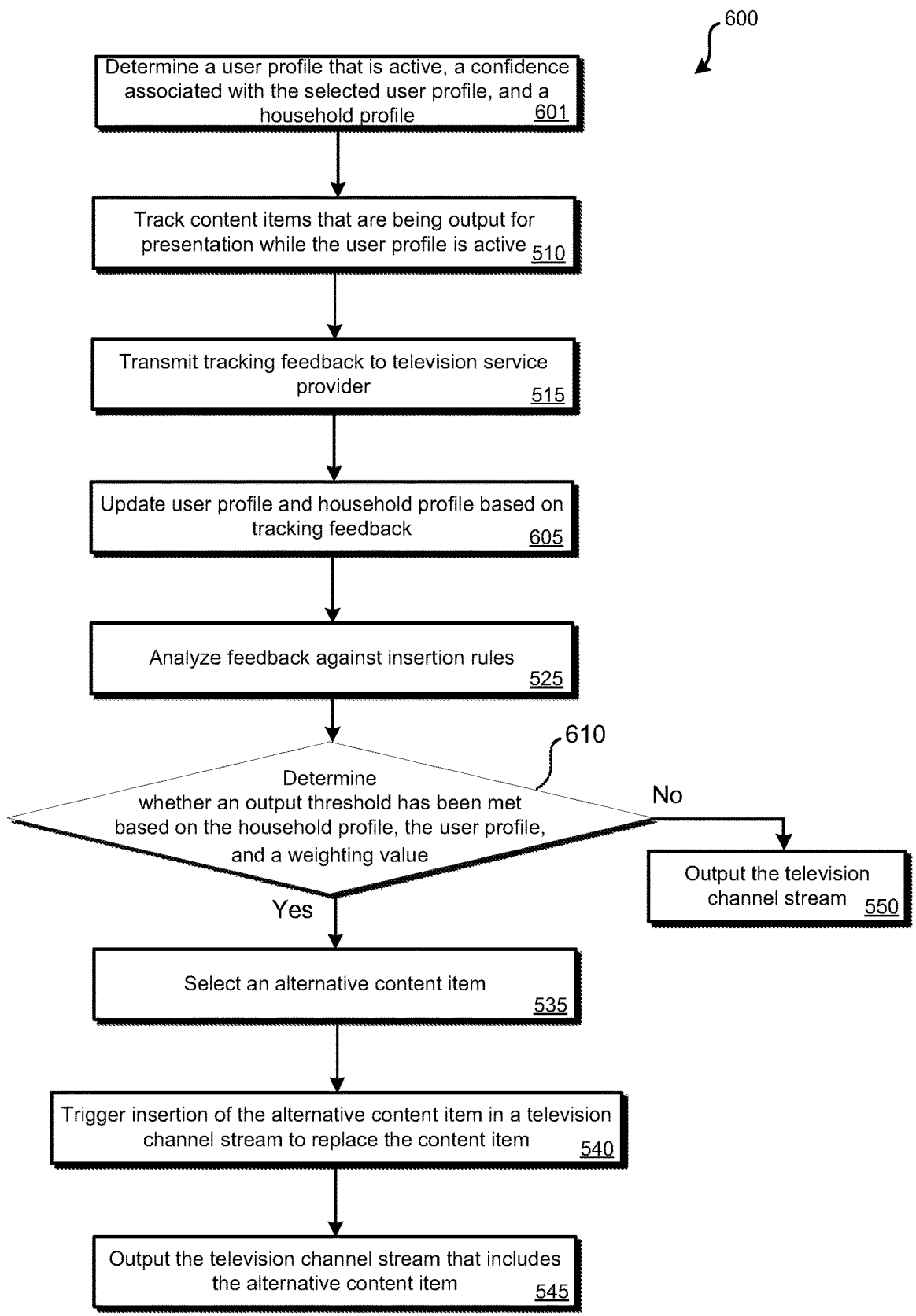
FIG. 6 illustrates another embodiment of a method for performing dynamic content insertion based on a user profile.

FIG. 6 illustrates an embodiment of a method 600 for performing dynamic content insertion based on a user profile and a household profile. Method 600 may be performed similarly to method 500, but additionally, the confidence of a selection of a user profile and a household profile are taken into account. Unless discussed separately, blocks that match FIG. 5 are performed as detailed in relation to method 500.

At block 601, a determination may be made as to the user profile that should be set to active for the television channel viewing session. Block 601 may include performing some or all of the steps of method 400. As part of determining the user profile that should be active, a confidence may be determined that is indicative of how likely the selected user profile is correct. If at least a threshold confidence is not reached, no user profile may be selected and only a household profile may be activated. Alternatively, a most-frequently used user profile mapped to the household profile may be activated. In addition to or as part of determining the active user profile, a household profile may be activated. In some embodiments, no household profile is maintained but rather user profiles that are associated with the same household are summed together to obtain household level information. The determination of block 601 may be performed by the television service provider system or by the device being used by the user, such as a television receiver or streaming content viewer.

At block 605, the user profile determined to be active may be updated based on the tracking feedback. This can include updating the user profile to reflect that the content item was output for presentation along with, possibly, an indication of when the content item was output. A household profile that is mapped to the user profile may also be updated based on the tracking feedback to indicate that the one or more content items were output for presentation. Depending on where the user profile is maintained, the update of block 520 may be performed by the television service provider system or by the viewing device. Similarly, blocks 525-545 may be performed locally by the viewing device or by the television service provider system as embodied in FIG. 1.

At block 610, a determination may be made as to whether an output threshold for any content item has been reached based on the data stored within the user profile and household profile based on the confidence. The confidence value determined at block 601 may be used to determine a weighting value or, in some embodiments, the confidence value may be used directly as the weighting value. The weighting value indicates how much data within the user profile should be weighted in relation to the household profile. Equation 1 represents an example of how a household profile, user profile, and weighting value can be used together to determine if an output threshold has been met.

$$\text{CombinedValue} = \text{HouseholdValue}(1-\text{WeightingValue}) + \text{UserValue}(\text{WeightingValue}) \quad \text{Eq. 1}$$

In equation 1, either the total number of views or the total number of views over a defined period of time (e.g., a rate of output) are used from the household profile and the user profile for HouseholdValue and UserValue, respectively. The WeightingValue is used to adjust the amount of weight afforded to each of these values. The output value of Equation 1, CombinedValue, is used for comparison with the output threshold value present in the insertion rules for a content item. It should be understood that in other embodiments, other equations may be used to obtain a combined value reflective of outputs performed at the household level and at the user level. If the output threshold has not been met for a content item by the CombinedValue, the television channel stream may be output without any modifications at block 550. That is, no content is dynamically inserted into the television channel stream based on the user profile being analyzed in combination with the insertion rules. However, if an output threshold is determined to be met at block 610 by the CombinedValue, method 600 may proceed to block 535.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for performing dynamic content insertion, the method comprising:

identifying a user profile as active at a television receiver based on the user profile being mapped to a current television viewing session;

tracking a plurality of video content items that have been output for presentation while the user profile is active across a plurality of television viewing sessions, wherein tracking the plurality of video content items comprises:

for a first video content item of the plurality of video content items, determining a number of times that the first video content item has been output while the user profile is active across the plurality of television viewing sessions; and for the first video content item of the plurality of video content items, determining an output rate during a time period at which the first video content item of the plurality of video content items has been output while the user profile is active across the plurality of television viewing sessions;

evaluating a set of insertion rules, wherein an insertion rule of the set of insertion rules is mapped to the first video content item and defines a predefined output threshold and a predefined output threshold rate for the first video content item;

determining that the output rate during the time period that the first video content item of the plurality of video content items has been output has met the predefined output threshold rate of the insertion rule for the first video content item for the user profile identified as active;

selecting an alternative video content item for insertion based on the set of insertion rules and determining that the first video content item has met the predefined output threshold rate for the user profile identified as active;

triggering the television receiver to substitute the alternative video content item into a television channel stream to replace the first video content item; and outputting, by the television receiver, the television channel stream that includes the alternative video content item.

2. The method for performing dynamic content insertion of claim 1, further comprising:
determining a confidence value indicative of how likely the user profile identified as active is correct.

3. The method for performing dynamic content insertion of claim 2, further comprising:
tracking the plurality of video content items that have been output for presentation at a household level regardless of any user profile.

4. The method for performing dynamic content insertion of claim 3, wherein determining that the video content item of the plurality of video content items has met the predefined output threshold for the user profile comprises:
determining a weighting value based on the determined confidence value indicative of how likely the user profile identified as active is correct;
calculating an output value based on the weighting value, the determined number of times that the video content item has been viewed while the user profile is active, and a number of times the video content item has been viewed at the household level based on a household profile; and
determining that the output value has met the predefined output threshold.

5. The method for performing dynamic content insertion of claim 1, wherein the plurality of video content items are advertisements presented during television commercial breaks.

6. The method for performing dynamic content insertion of claim 1, wherein identifying the user profile is based on a hierarchical evaluation of a plurality of user profile identification factors.

7. The method for performing dynamic content insertion of claim 6, wherein the hierarchical evaluation of the plurality of user profile identification factors comprises determining the user profile based on a type of content being output for presentation.

8. The method for performing dynamic content insertion of claim 1, wherein triggering comprises a remote server system transmitting an insertion message to the television receiver, the method further comprising: retrieving, by the television receiver, the alternate video content item from a processor-readable storage medium of the television receiver.

9. A dynamic content insertion system, the dynamic content insertion system comprising:
a television service provider system, comprising:
a metadata insertion system that adds metadata to a plurality of television channel streams prior to the plurality of television channel streams being transmitted to a plurality of television receivers;
a user identification system that identifies a user profile as active at a television receiver based on the user profile being mapped to a current television viewing session;
a tracking system that:
tracks a plurality of video content items that has been output for presentation while the user profile is active across a plurality of television viewing sessions, wherein tracking the plurality of video content items comprises the tracking system being configured to:
determine a number of times that a first video content item of the plurality of video content items has been output while the user profile is active across the plurality of television viewing sessions; and
determine an output rate during a time period at which the first video content item of the plurality of video content items has been output while the user profile is active across the plurality of television viewing sessions; and
an insertion trigger system that:
evaluates a set of insertion rules, wherein an insertion rule of the set of insertion rules is mapped to the first video content item and defines a predefined output threshold and a predefined output threshold rate for the first video content item;
determines that the output rate during the time period that the first video content item of the plurality of video content items has been output has met the predefined output threshold rate for the user profile identified as active;
selects an alternative video content item for insertion based on determining that the first video content item has met the predefined output threshold rate of the insertion rule for the first video content item for the user profile identified as active; and
triggers the television receiver to substitute the alternative video content item into a television channel stream to replace the video content item.

10. The dynamic content insertion system of claim 9, wherein the system further comprises the plurality of television receivers.

11. The dynamic content insertion system of claim 10, wherein each television receiver of the plurality of television receivers transmits feedback via the Internet to the television service provider system indicative of the plurality of video content items being output.

12. The dynamic content insertion system of claim 10, wherein:
the insertion triggering system that triggers the television receiver to substitute the alternative video content item in the television channel stream is configured to transmit an insertion trigger message via the Internet; and
the insertion trigger message indicates a video content item identifier and an alternative video content item identifier.

13. The dynamic content insertion system of claim 9, wherein the system further comprises a plurality of streaming content viewer devices.

14. The dynamic content insertion system of claim 9, wherein the user identification system is configured to determine a confidence value indicative of how likely the user profile identified as active is correct.

15. The dynamic content insertion system of claim 9, wherein the tracking system is configured to track the plurality of video content items that have been output for presentation at a household level regardless of any user profile.

16. The dynamic content insertion system of claim 15, wherein the insertion trigger system that determines that the video content item of the plurality of video content items has met the predefined output threshold for the user profile comprises the insertion trigger system being configured to:
    determine a weighting value based on the determined confidence value indicative of how likely the user profile identified as active is correct;
    calculate an output value based on the weighting value, the determined number of times that the video content item has been viewed while the user profile is active, and a number of times the video content item has been viewed at the household level based on a household profile; and
    determine that the output value has met the predefined output threshold.

17. A non-transitory processor-readable medium comprising processor-readable instructions configured to cause one or more processors to:
    identify a user profile as active at a television receiver based on the user profile being mapped to a current television viewing session;
    track a plurality of video content items that have been output for presentation while the user profile is active across a plurality of television viewing sessions, wherein tracking the plurality of video content items comprises:
        for a first video content item of the plurality of video content items, determine a number of times that the first video content item of the plurality of video content items has been output while the user profile is active across the plurality of television viewing sessions; and
        for the first video content item of the plurality of video content items, determine an output rate during a time period at which the first video content item of the plurality of video content items has been output while the user profile is active across the plurality of television viewing sessions;
    evaluate a set of insertion rules that are mapped to the first video content item and defines a predefined output threshold and a predefined output threshold rate for the first video content item;
    determine the output rate during the time period first video content item of the plurality of video content items has been output has met the predefined output threshold of an insertion rule for the first video content item for the user profile identified as active;
    select an alternative video content item for insertion based on the set of insertion rules and determining that the video content item has met the predefined output threshold for the user profile identified as active; and
    trigger the television receiver to substitute the alternative video content item into a television channel stream to replace the video content item.

* * * * *